(12) United States Patent
Chen et al.

(10) Patent No.: US 7,998,912 B2
(45) Date of Patent: Aug. 16, 2011

(54) COMPOSITE LUBRICANT FOR HARD DISK MEDIA

(75) Inventors: Shaun H. Chen, Cupertino, CA (US);
Yasuo Sakane, San Jose, CA (US);
Henry S. Nishihira, San Jose, CA (US);
Chi Kong Kwok, Fremont, CA (US);
The V. Tran, San Jose, CA (US);
Bing-Shiuan Chang, San Jose, CA (US)

(73) Assignee: WD Media, Inc., San Jose, CA (US)

( * ) Notice: Subject to any disclaimer, the term of this patent is extended or adjusted under 35 U.S.C. 154(b) by 0 days.

(21) Appl. No.: 12/559,450

(22) Filed: Sep. 14, 2009

(65) Prior Publication Data

US 2011/0064970 A1    Mar. 17, 2011

(51) Int. Cl.
*C10M 157/02* (2006.01)
*C10M 157/04* (2006.01)
*C10M 157/08* (2006.01)
*G11B 5/65* (2006.01)
*G11B 5/725* (2006.01)
*G11B 5/72* (2006.01)

(52) U.S. Cl. ............ 508/422; 508/582; 428/833.3; 428/833.4; 428/835.8; 427/128

(58) Field of Classification Search .............. 508/422, 508/442, 449, 482; 428/833, 833.3, 833.4, 428/835.8; 427/128–133
See application file for complete search history.

(56) References Cited

U.S. PATENT DOCUMENTS

| | | | |
|---|---|---|---|
| 4,721,795 A | 1/1988 | Caporiccio et al. | |
| 5,441,655 A | 8/1995 | Odello et al. | |
| 5,453,539 A | 9/1995 | Kondo et al. | |
| 5,498,457 A | 3/1996 | Ishihara et al. | |
| 5,560,995 A | 10/1996 | Usuki et al. | |
| 5,587,217 A | 12/1996 | Chao et al. | |
| 5,820,964 A | 10/1998 | Nakakawaji et al. | |
| 5,908,817 A | 6/1999 | Perettie et al. | |
| 6,025,310 A | 2/2000 | Nishiguchi et al. | |
| 6,468,947 B1 | 10/2002 | Falcone et al. | |

(Continued)

FOREIGN PATENT DOCUMENTS

JP    2002275484 A2    9/2002

(Continued)

OTHER PUBLICATIONS

"Bonding, degradation, and environemntal efects on novel perfluoropolyether lubricants" Tao and Bhushan WEAR 259 (2005) 1352-1361.*

*Primary Examiner* — Ellen M McAvoy
*Assistant Examiner* — Pamela Weiss

(57) ABSTRACT

A composite lubricant for recording disk media, a recording disk media including a layer of the composite lubricant, and method of manufacturing the same are described. The composite lubricant may include a non-phosphazene component and a phosphazene component where the non-phosphazene component is a difunctional perfluoropolyether compound terminated with first and second polar end groups, the first polar end group comprising a first number of hydroxyls and the second polar end includes a second number of hydroxyls, greater than the first number of hydroxyls. The phosphazene component may be a difunctional perfluoropolyether compound terminated with a phosphazene functional group and with a third polar end group, the third polar end group comprising a third number of hydroxyls equal to the second number of hydroxyls.

24 Claims, 4 Drawing Sheets

U.S. PATENT DOCUMENTS

| | | |
|---|---|---|
| 6,541,431 B1 | 4/2003 | Akada et al. |
| 6,608,009 B2 | 8/2003 | Akada et al. |
| 6,645,634 B1 | 11/2003 | Shirai et al. |
| 6,730,403 B1 | 5/2004 | Shirai et al. |
| 6,816,341 B2 | 11/2004 | Matsumoto et al. |
| 7,252,897 B2 | 8/2007 | Shimokawa et al. |
| 7,510,999 B2 | 3/2009 | Deng et al. |
| 7,670,695 B2 * | 3/2010 | Wakabayashi et al. .... 428/833.3 |
| 2002/0183211 A1 | 12/2002 | Akada et al. |
| 2006/0052262 A1 | 3/2006 | Akada et al. |
| 2006/0229217 A1 * | 10/2006 | Liu et al. ................ 508/422 |
| 2008/0020171 A1 * | 1/2008 | Wakabayashi et al. ...... 428/65.8 |
| 2009/0155517 A1 * | 6/2009 | Suzuki et al. ............ 428/65.8 |

FOREIGN PATENT DOCUMENTS

| | | |
|---|---|---|
| JP | 2002293787 A2 | 9/2002 |
| JP | 2002294266 A2 | 9/2002 |
| JP | 2004352999 A2 | 12/2004 |
| JP | 2006307123 A2 | 9/2006 |
| WO | WO 2006009057 A1 * | 1/2006 |

* cited by examiner

COMPOSITE LUBRICANT FOR HARD DISK MEDIA

TECHNICAL FIELD

Embodiments of the present invention generally relate to a composite lubricant and, in particular, to a composite lubricant for magnetic recording disks.

BACKGROUND

A disk drive system typically has one or more magnetic recording disks and control mechanisms for storing data within the disks. The magnetic recording disk is composed of a substrate and one or more layers deposited above the substrate. Typically, to provide a reliable head-disk interface, a carbon-based overcoat (COC) is applied above a base structure of the magnetic recording disk and a lubricant layer is disposed above the COC so that the head then flies over the lubricant layer.

An example of such a lubricant is a Fomblin-based perfluoropolyether compound (e.g., "Z-Dol," commercially available from Solvay-Solexis of Thorofare, N.J.). Fomblin-based compounds are known to react with metals, such as alumina, contained in head members, cleaving the main chain of the perfluoropolyether and depolymerizing the lubricant into volatile byproducts. Phosphazene additives inhibit degradation of disk lubricant that occurs during head-disk contact and, thereby, improve the head-disk interface durability. For example, a phosphazene functionalized perfluoropolyether material, such as "Phospharol A20H," commercially available from Matsumura Oil Research Corp. (MORESCO) of Japan, may be combined with Fomblin Z-Dol.

To further increase storage densities and processing speeds of disk drives, it is desirable to reduce the distance between the head and disk (flying height) or accelerate the rotation of the disk. However, in either situation, the head may come into contact with the disk more often and, thereby, transfer lubricant from the surface of the disk to the head. Because lubricant transfer results in lubricant build up on the head, which can result in high fly write (HFW) problems, Solvay-Solexis and others have made available products such as "Fomblin Z-Tetraol," which have lower mobility than Z-Dol. Nevertheless, due to compatibility issue with A20H, such lubricant systems may have significant limitations in composition and thus performance.

BRIEF DESCRIPTION OF THE DRAWINGS

Embodiments of the present invention are illustrated by way of example, and not limitation, in the figures of the accompanying drawings in which.

DETAILED DESCRIPTION

Figure 1:
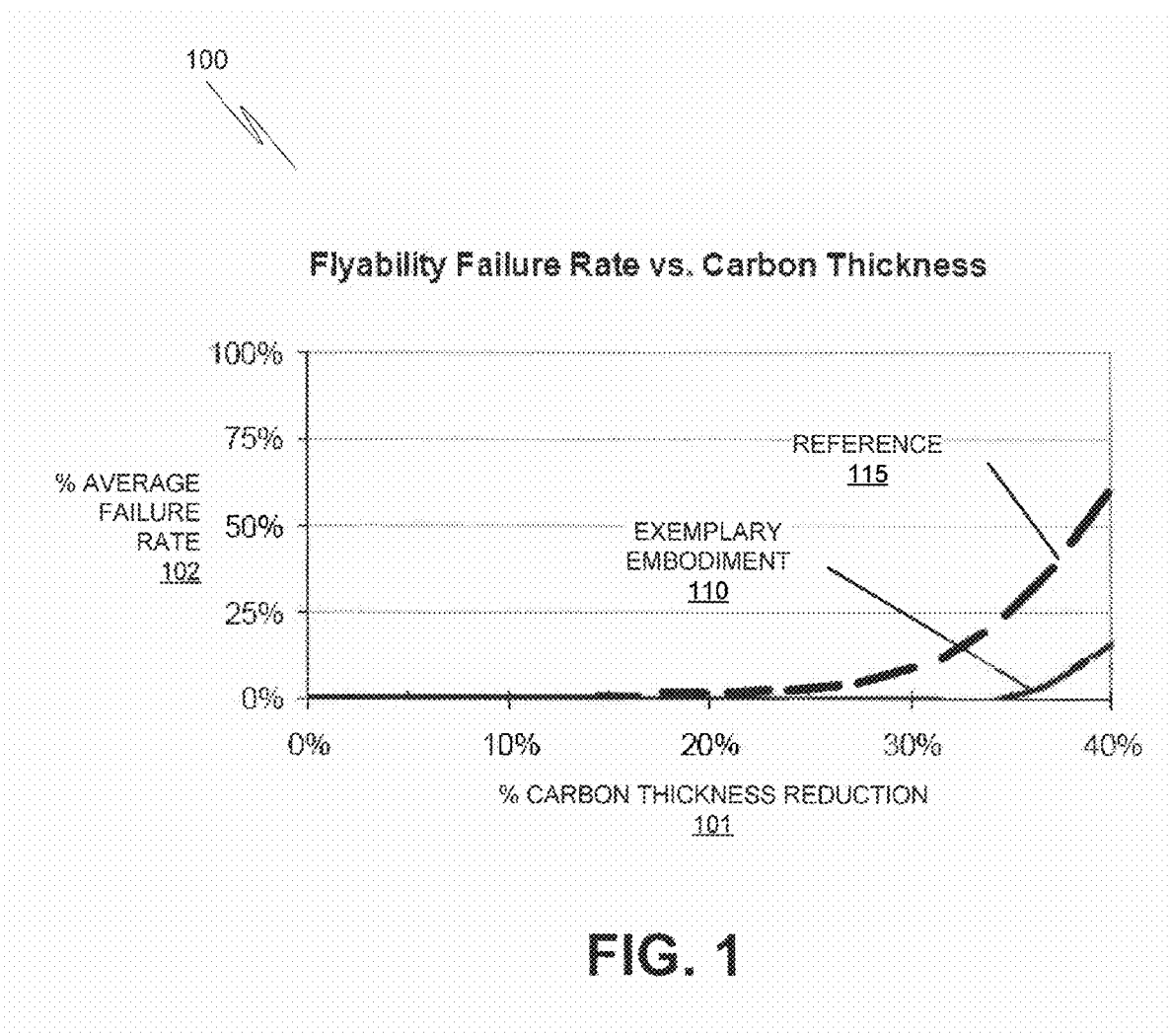
FIG. 1 illustrates flyability of a composite lubricant, in accordance with one embodiment of the present invention.

In the following description, numerous specific details are set forth such as examples of specific, components, processes, etc. to provide a thorough understanding of various embodiments of the present invention. It will be apparent, however, to one skilled in the art that these specific details need not be employed to practice various embodiments of the present invention. In other instances, well known chemical compositions or synthesis methods have not been described in detail to avoid unnecessarily obscuring various embodiments of the present invention. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment. Furthermore, the particular features, structures, materials, or characteristics may be combined in any suitable manner in one or more embodiments Disclosed herein are embodiments of a composite lubricant system that may provide a superior balance in substrate adhesion and mobility between the lubricant components. Generally, embodiments of the present invention provide for a lubricant composition in which the relative reactivity of the end groups in each component with the substrate upon which the end group is to adhere are selected so that active sites on the substrate to which the lubricant is to adhered are occupied by the individual components at a ratio which maximizes the effect of each component. While exemplary embodiments pertaining to composite lubricants for carbon-based overcoat (COC) layers, such as those on a magnetic recording media disk, are described further herein in great detail, this principle of matching the lubricant-substrate adhesion property between the components of a composite lubricant may be applied to other similar lubricant systems as well as other lubricant-substrate combinations having similar chemical constituents and similar surfaces.

Specific embodiments of the present invention include a recording media lubricant composition having components which balance substrate adhesion and/or mobility between the lubricant components to provide the composite lubricant with strong adhesion and high durability. Further embodiments include a magnetic recording media disk having a base structure with a COC disposed above the base structure, and a lubricant layer having the composite lubricant composition described herein disposed on the COC. Additional embodiments include methods of manufacturing a magnetic recording disk to include a lubricant layer having the lubricant composition described herein.

For the exemplary magnetic recording disk embodiment, it has been found that the presence of polar end-groups is an important factor in the interaction between a lubricant component and a carbon-based surface (e.g., of the COC). More specifically, the presence of hydroxyl (—OH) or alcohol groups in the polar end-groups has been found to be a factor in altering the lubricant-to-carbon adhesion property of each lubricant component so that, through proper design of the hydroxyl populations in the polar end groups, this adhesion property can be matched between the two lubricant components to good effect.

In an embodiment, a composite lubricant is provided in which at least some amount of a non-phosphazene component and a phosphazene component is present in the composition. It should be appreciated, however, that these two components are not necessarily exclusive of any other component.

In one embodiment, to achieve a desired balance in the adhesion property of the non-phosphazene component and a phosphazene component, the chemical constituents of the non-phosphazene component and a phosphazene component each include polar end groups having a particular number of hydroxyls.

In one embodiment, the non-phosphazene component includes a main polymer chain terminated at a first end by first polar functional end group and terminated at a second end by a second polar functional end group, where the first polar functional end group has a first number (n) of hydroxyls and the second polar functional end group has a second number (m) of hydroxyls that is greater than the first number of hydroxyls. As such, the non-phosphazene component may be described as a difunctional compound with polar functional end groups that are asymmetrical with respect to the number of hydroxyls present and is represented by the Formula (1), $$R^1\text{-(repeating unit)-}R^2 \tag{1}$$

where $R^1$ includes (p) hydroxyl groups, $R^2$ includes (q) hydroxyl groups with each of p and q being an integer. The repeating unit is a homopolymer or copolymer known in the art to process lubricant properties. In one particular embodiment, the non-phosphazene component is a difunctional perfluoropolyether (PFPE) compound comprising perfluoroxyalkylene units and represented by Formula (2),

$$R^1-O-(CF_2-CF_2-O)_n-(CF_2-O)_m-R^2 \tag{2}$$

where each of n and m is between 1 and 30.

In another embodiment, the phosphazene component includes a main polymer chain terminated at a first end by a phosphazene functional group. In one particular embodiment, the phosphazene functional group is a cyclotriphosphazene functional group. With each with phosphorus atom having an oxidation state of five in the cyclotriphosphazene functional group, two branches are present on each phosphorus of the $P_3N_3$ ring for a total of six branches so that the phosphazene component is represented by the Formula (3),

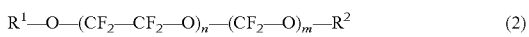
$$G\text{-}[(CF_2-CF_2-O)_n-(CF_2-O)_m-R^3]_z \tag{3}$$

where G is a functional terminal group represented by the Formula (4), $$-CF_2-CH_2-O-P_3N_3-[(O-C_6H_4)-R]_{6-z} \tag{4}$$

and where z is between 1 and 5, n and m between 1 and 30, and R is any of a hydrogen atom, aryl, aryloxy, $C_{1-4}$ alkyl, $C_{1-4}$ alkoxy, or $C_{1-4}$ haloalkyl. In exemplary haloalkyl embodiments, G is $-CF_2-CH_2-O-P_3N_3-(O-C_6H_4CF_3)_5$ and in one such embodiment has the specific chemical structure

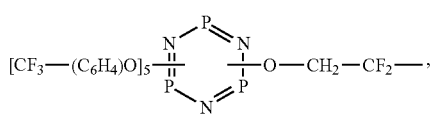

such that the phosphazene component is represented by the Formula (5),

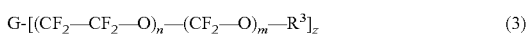
$$-CF_2-CH_2-O-P_3N_3-(O-C_6H_4CF_3)_5-(CF_2-CF_2-O)_n-(CF_2-O)_m-R^3 \tag{5}$$

In an embodiment, the phosphazene component is terminated at a second end by the third polar end group ($R^3$) having a third number (r) of hydroxyls.

In an embodiment, the third number of hydroxyls is greater than the first number of hydroxyls (r>p). In a further embodiment, the third number of hydroxyls is equal to the second number of hydroxyls (r=q) so that the general relationship in hydroxyl populations across the non-phosphazene and phosphazene components is give by Formula 6;

$$p<q=r. \tag{6}$$

In an exemplary embodiment where the non-phosphazene component has a first polar end group ($R^1$) with one hydroxyl (p=1) and a second polar end group ($R^2$) with two hydroxyls (q=2), the third number (r) of hydroxyls in the third polar end group ($R^3$) of the phosphazene component is equal to two (i.e., p=1; q=r=2).

The above relationship of hydroxyl or alcohol groups present on the polar end groups of the exemplary embodiment has been found to be particular effective in balancing the lubricant/carbon interaction between the lubricant components. While not being bound by theory, it is thought that by providing one terminal of the phosphazene component with more hydroxyl groups than are on one terminal of the non-phosphazene component, the phosphazene component can better compete with the non-phosphazene component for active carbon sites on the COC. This is thought to increase the relative reactivity of the phosphazene component relative to the non-phosphazene component. Furthermore, with one end of each of the phosphazene and the non-phosphazene component having a relatively large number of hydroxyl groups (e.g., q=r=2), both the phosphazene and non-phosphazene components are believed to strongly adhere to their active carbon sites, resulting in an excellent matching between the components.

In the exemplary embodiment, the second and third polar end groups ($R^2$, $R^3$) are a same diol. In one such embodiment, each of $R^2$ and $R^3$ are a same glycol derivative, include an ethyl hydroxol, and are represented by the Formula (7),

$$CF_2CH_2OCH_2CH(OH)CH_2OH \tag{7}$$

With $R^1$ having a single hydroxyl, only the terminal carbon includes a hydroxyl substitution group (i.e., methyl hydroxol), a first of $R^1$ and $R^2$ in the non-phosphazene component of Formula (2) is $CH_2OH-CF_2-$ and the other of $R^1$ and $R^2$ is $-CF_2-CH_2-O-CH_2CH(OH)CH_2OH$ so that Formula (2) is represented as Formula (8),

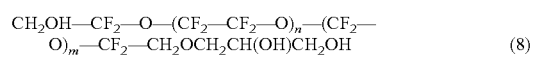
$$CH_2OH-CF_2-O-(CF_2-CF_2-O)_n-(CF_2-O)_m-CF_2-CH_2OCH_2CH(OH)CH_2OH \tag{8}$$

This difunctional perfluoropolyether compound, designated as "Z-Triol" to denote the presence of three hydroxyl groups, can be obtained by chemically modifying Fomblin Z-Dol in a way similar to forming Z-Tetraol.

The phosphazene component of Formula (3) is then represented as Formula (9):

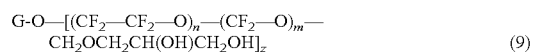
$$G\text{-}O-[(CF_2-CF_2-O)_n-(CF_2-O)_m-CH_2OCH_2CH(OH)CH_2OH]_z \tag{9}$$

with the exemplary embodiment of Formula (5) then represented as Formula (10),

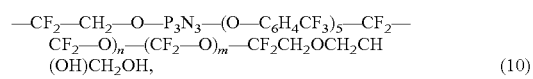
$$-CF_2-CH_2-O-P_3N_3-(O-C_6H_4CF_3)_5-CF_2-CF_2-O)_n-(CF_2-O)_m-CF_2CH_2OCH_2CH(OH)CH_2OH, \tag{10}$$

which is currently known as ADOH and available from MORESCO of Japan.

The exemplary composite lubricant embodiment may have much higher tolerance to increasing the phosphazene component:non-phosphazene component weight ratio than do conventional lubricant systems not having this particular relationship of end group hydroxyls. For example, where the non-phosphazene component is a symmetrical difunctional PFPE with a much greater total number of hydroxyl groups than the phosphazene component (e.g., 4:1 in the case of a PFPE lubricant having two hydroxyl groups in each terminal and a phosphazene functionalized PFPE having one hydroxyl group at one terminal), the tolerance to the phosphazene functionalized PFPE is very low requiring ratios of at least 70:30 or even as high as 95:5. At such low phosphazene content, however, such conventional lubricant systems may suffer from head smear because of an inadequate amount of phosphazene functional groups to prevent lubricant degradation. In contrast, for the exemplary embodiment described above, the non-phosphazene component:phosphazene component weight ratios may be within a range of 90:10 to 10:90 with ratios of 50:50 or less still providing good adhesion even when the COC thickness is reduced to 30 Å or less.

Other experiments conducted with a phosphazene component having a somewhat greater total number of hydroxyl groups (e.g., a phosphazene functionalized PFPE having two hydroxyl groups at one terminal) combined with a non-phosphazene component is a symmetrical difunctional PFPE having two hydroxyl groups at each terminal, such that the hydroxyl group relationship became p=q=r rather that of Formula (6), displayed considerably poorer durability. Again, not being bound by theory, it is believed that this arrangement of hydroxyls causes the mobility of the lubricant components to be too low to function as well as the exemplary embodiment.

Tribology tests were performed for various COC thicknesses to determine the performance of the exemplary embodiment described. FIG. 1 is a graph 100 illustrating results of a flyability test conducted at 60° C. and 10% relative humidity with constant flight on a single tract (at a fixed radius) with a head/disk clearance of 1.5 nm. The graph 100 has an x-axis 101 demarking a percentage (%) reduction in COC thickness relative to an initial reference thickness and a y-axis 102 demarking a % average failure rate. As shown, with reductions in the COC thickness, the exemplary composite lubricant embodiment 110 displays better performance relative to a reference lubricant system 115 having the 4:1 ratio of total hydroxyls as described above.

Figure 2:
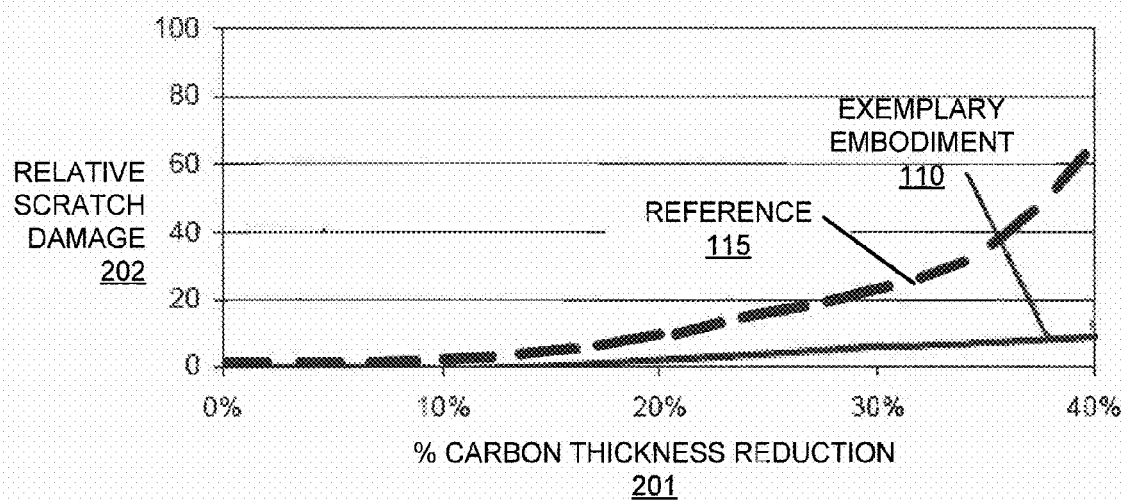
FIG. 2 illustrates scratch damage susceptibility of a composite lubricant in accordance with one embodiment of the present invention.

As further depicted in FIG. 2, a scratch damage test was performed to measure how easily a disk surface can be damaged by discrete submicron particles of aluminum oxide (a contaminant commonly found in disk drives). In FIG. 2, the graph 200 has an x-axis 201 demarking a % reduction in COC thickness. The y-axis 202 demarks a relative scratch damage measure. As shown, with reductions in the COC thickness, the exemplary composite lubricant embodiment 110 displays less damage than the reference lubricant system 115 having the 4:1 ratio of hydroxyls as described above.

Figure 3:
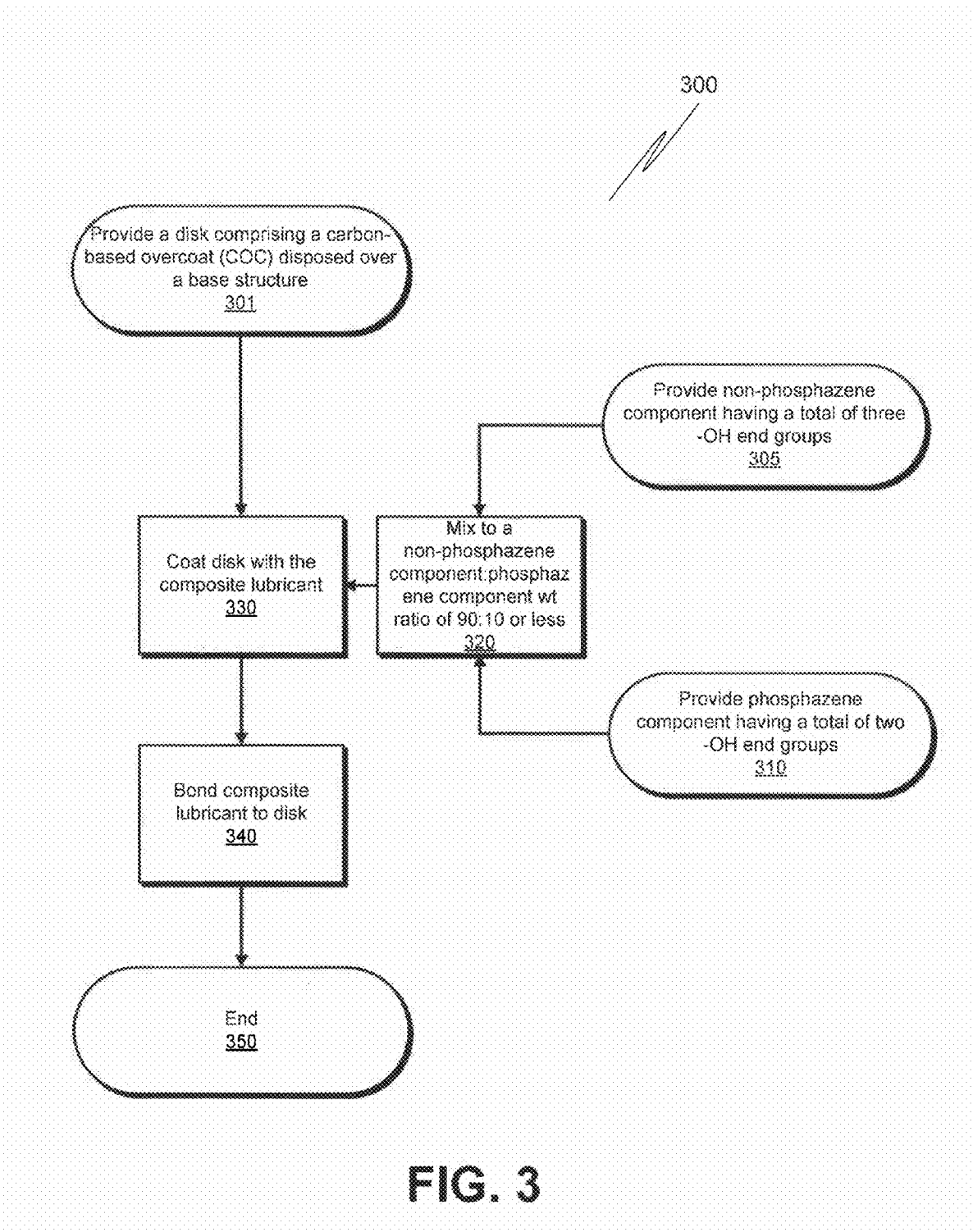
FIG. 3 illustrates a flow diagram for a method of forming recording media disk, in accordance with one embodiment of the present invention.
Figure 4:
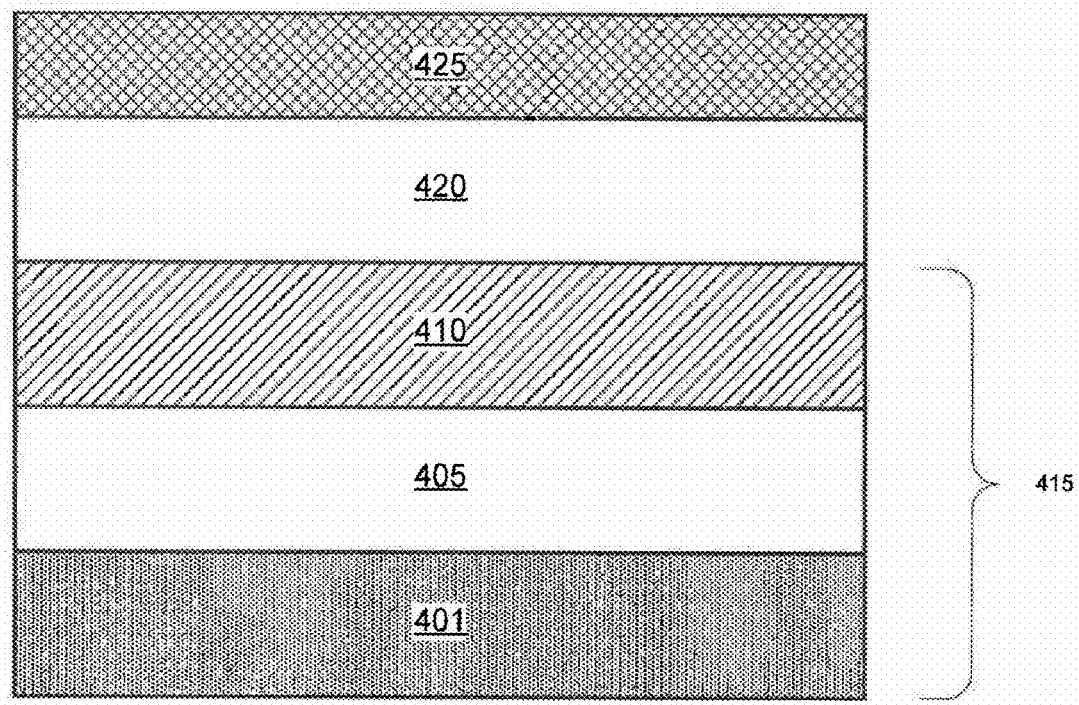
FIG. 4 illustrates a schematic cross-sectional view of a magnetic recording disk including a composite lubricant layer in accordance with one embodiment of the present invention.

FIG. 3 illustrates a flow diagram for a method 300 of forming a magnetic media, such as the magnetic recording disk 400, further depicted in cross-section in FIG. 4. Method 300 begins at operation 301 with providing a magnetic recording disk including a carbon-based overcoat (COC) disposed above a base structure. In the exemplary embodiment depicted in FIG. 4, a base structure 415 includes a support substrate 401, a plurality of intermediate layers 405 and at least one magnetic recording layer 410. The substrate 401 may be of any material known in the art for magnetic recording media disks, such as, but not limited to, aluminum-magnesium (AlMg), nickel phosphorous (NiP), glass, and ceramics. The plurality of intermediate layers 405 may include, but not limited to, one or more seed layers, soft magnetic underlayers (SUL) and interlayers known in the art. The magnetic recording layer 410 may be composed of magnetic alloys made of cobalt (Co), platinum (Pt), and other elements including Cr. In alternative embodiments, the magnetic recording layer 410 may be composed of other magnetic alloys. Disposed above the base structure 415 is a COC 420 which may be composed of a carbon-based material known in the art, such as, but not limited to diamond-like carbon (DLC) and chemical vapor deposited carbon (CVD-carbon) which may include hydrogenated or nitrogenated carbon.

Returning to FIG. 3, at operation 330, the COC 420 is coated with an embodiment of the composite lubricant, described herein. Conventional coating processes known in the art may be utilized at operation 330, such as dip coating, spin coating, and the like. In the depicted embodiment, the composite lubricant is a mixture including a non-phosphazene component provided at operation 305 and a phosphazene component provided at operation 310. The non-phosphazene component may be any difunctional perfluoropolyether compound component described as an embodiment herein and, in a particular embodiment, is terminated with first and second polar end groups, the first polar end group having a first number of hydroxyls and the second polar end having a second number of hydroxyls, greater than the first number of hydroxyls. For the exemplary embodiment depicted in FIG. 3, the non-phosphazene component has a total of three hydroxyl end groups, such as the materials represented by formula (8).

The phosphazene component provided at operation 310 may be any difunctional perfluoropolyether compound described as an embodiment elsewhere herein and in a particular embodiment is terminated with a phosphazene functional group at a first end and with a third polar end group at a second end, the third polar end group comprising a third number of hydroxyls, equal to the second number of hydroxyl end groups, such as the material represented by formula (10).

In the exemplary embodiment depicted in FIG. 3, at operation 320, the components are mixed to a non-phosphazene component:phosphazene component weight ratio of 90:10, or less. In one particularly embodiment, the composite lubricant is mixed to a non-phosphazene component:phosphazene component weight ratio of 50:50, or less. It will be appreciated that the mixing of operation 320 may be performed at any time prior to operation 330.

At operation 340, the composite lubricant is bonded to the COC to complete the formation of a composite lubricant layer 425 on the COC 420 of FIG. 4. In a particular embodiment, the bonding operation 340 includes an exposure of the lubricant to UV light. Subsequent to the bonding operation 340, at operation 350 method 300 is completed in a conventional manner to form the recording media disk 400.

The terms "over," "above," "between," and "on" as used herein refer to a relative position of one layer with respect to other layers. For example, one layer disposed over or above another layer may be directly in contact with the other layer or may have one or more intervening layers. Furthermore, one layer disposed between layers may be directly in contact with the two layers or may have one or more intervening members. In contrast, a first layer "on" a second member is in contact with that second layer. Additionally, the relative position of one layer with respect to other layers is provided assuming operations are performed relative to a substrate without consideration of the absolute orientation of the substrate.

In the foregoing specification, embodiments of the invention have been described with reference to specific exemplary features thereof. It will, however, be evident that various modifications and changes may be made thereto without departing from the broader scope of embodiments of the invention as set forth in the appended claims. The specification and figures are, accordingly, to be regarded in an illustrative rather than a restrictive sense.

What is claimed is:

1. A composite lubricant comprising:
   a non-phosphazene component comprising a difunctional perfluoropolyether compound terminated with first and second polar end groups, the first polar end group comprising a first number of hydroxyls and the second polar end comprising a second number of hydroxyls that is greater than the first number of hydroxyls; and
   a phosphazene component combined with the non-phosphazene component, the phosphazene component comprising a difunctional perfluoropolyether compound terminated with a phosphazene functional group and with a third polar end group, the third polar end group comprising a third number of hydroxyls.

2. The composite lubricant of claim 1, wherein the first polar end group includes only one hydroxyl and the second polar end group comprises two hydroxyls.

3. The composite lubricant of claim 2, wherein the third polar end group comprises two hydroxyls.

4. The composite lubricant of claim 1, wherein the third number of hydroxyls is greater than the first number of hydroxyls.

5. The composite lubricant of claim 4, wherein the third number of hydroxyls equals the second number of hydroxyls.

6. The composite lubricant of claim 5, wherein the second and third polar end groups are the same.

7. The composite lubricant of claim 1, wherein a non-phosphazene component:phosphazene component ratio is in a range of 90:10 to 10:90.

8. The composite lubricant of claim 7, wherein a non-phosphazene component:phosphazene component ratio is 50:50 or less.

9. The composite lubricant of claim 1, wherein each of the first number of hydroxyls, the second number of hydroxyls, and the third number of hydroxyls is a substitution group on a terminal carbon.

10. The composite lubricant of claim 1, wherein the difunctional perfluoropolyether compound is terminated at each end with a methyl hydroxol (—$CH_2$—O—H).

11. The composite lubricant of claim 1, wherein the phosphazene component is terminated at one end with a methyl hydroxol (—$CH_2$—OH).

12. The composite lubricant as in claim 1, wherein the non-phosphazene component is represented by the chemical formula:
   $R_1$—O—($CF_2$—$CF_2$—O)$_n$—($CF_2$—O)$_m$—$R_2$, wherein $R_1$ is $CH_2OH$—$CF_2$—O—, $R_2$ is —$CF_2$—$CH_2$—O—$CH_2CH(OH)CH_2OH$, and n and m are between 1 and 30.

13. The composite lubricant as in claim 1, wherein the phosphazene component is represented by the chemical formula:
   G-($CF_2$—$CF_2$—O)$_n$—($CF_2$—O)$_m$—$R_3$, wherein G is —$CF_2$—$CH_2$—O—$P_3N_3$—(O—$C_6H_4$—$CF_3$)$_5$, $R_3$ is —$CF_2$—$CH_2$—O—$CH_2CH(OH)CH_2OH$, and n and m are between 1 and 30.

14. The composite lubricant as in claim 13, wherein G is

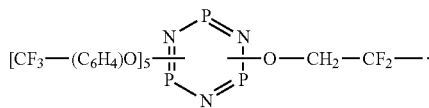

15. A method, comprising:
   providing a disk comprising a carbon-based overcoat (COC) disposed thereon; and
   forming a composite lubricant on the COC, wherein the composite lubricant comprises:
      a non-phosphazene component comprising a difunctional perfluoropolyether compound terminated with first and second polar end groups, the first polar end group comprising a first number of hydroxyls and the second polar end comprising a second number of hydroxyls, greater than the first number of hydroxyls; and
      a phosphazene component combined with the non-phosphazene component, the phosphazene component comprising a difunctional perfluoropolyether compound terminated with a phosphazene functional group and with a third polar end group, the third polar end group comprising a third number of hydroxyls.

16. The method of claim 15, wherein the first polar end group includes only one hydroxyl, the second polar end group comprises two hydroxyls, and the third polar end group comprises two hydroxyls.

17. The method of claim 16, wherein the non-phosphazene component is mixed with the phosphazene component at a non-phosphazene component:phosphazene component ratio of 50:50 or less.

18. The method of claim 17, wherein forming the composite lubricant on the COC comprises:
   coating the disk with the composite lubricant; and
   bonding the composite lubricant to the COC by exposure to ultraviolet (UV) light.

19. The method of claim 15, wherein the non-phosphazene component is represented by the chemical formula:
   $R_1$—($CF_2$—$CF_2$—O)$_n$—($CF_2$—O)$_m$—$R_2$, wherein $R_1$ is $CH_2OH$—$CF_2$—O, $R_2$ is $CF_2$—$CH_2OCH_2CH(OH)CH_2OH$, and n and m are between 1 and 30; and
   wherein the phosphazene component is represented by the chemical formula:
   G-($CF_2$—$CF_2$—O)$_n$—($CF_2$—O)$_m$—$R_3$, wherein G is —$CF_2$—$CH_2$—O—$P_3N_3$—(O—$C_6H_4$—$CF_3$)$_5$, $R_3$ is —$CF_2$—$CH_2OCH_2CH(OH)CH_2OH$, and n and m are between 1 and 30.

20. A magnetic recording disk, comprising:
   a base structure;
   a carbon-based overcoat (COC) disposed above the base structure; and
   a composite lubricant layer disposed above the COC, the composite lubricant layer comprising:
      a non-phosphazene component comprising a difunctional perfluoropolyether compound terminated with first and second polar end groups, the first polar end group comprising a first number of hydroxyls and the second polar end comprising a second number of hydroxyls, greater than the first number of hydroxyls; and
      a phosphazene component combined with the non-phosphazene component, the phosphazene component comprising a difunctional perfluoropolyether compound terminated with a phosphazene functional group and with a third polar end group, the third polar end group comprising a third number of hydroxyls.

21. The magnetic recording disk of 20, wherein the composite lubricant layer has a thickness in a range of 5 to 30 Angstroms.

22. The magnetic recording disk of 20, wherein the first polar end group includes only one hydroxyl, the second polar end group comprises two hydroxyls, and the third polar end group comprises two hydroxyls.

23. The magnetic recording disk of 20, wherein the non-phosphazene component is mixed with the phosphazene component at a non-phosphazene component: phosphazene component ratio of 50:50 or less.

24. The magnetic recording disk of 20, wherein the non-phosphazene component is represented by the chemical formula:

$R_1$—O—$(CF_2$—$CF_2$—$O)_n$—$(CF_2$—$O)_m$—$R_2$, wherein $R_1$ is $CH_2OH$—$CF_2$—, $R_2$ is —$CF_2$—$CH_2OCH_2CH(OH)CH_2OH$, and n and m are between 1 and 30; and wherein the phosphazene component is represented by the chemical formula:

G—O—$(CF_2$—$CF_2$—$O)_n$—$(CF_2$—$O)_m$—$R_3$, wherein G is —$CF_2$—$CH_2$—O—$P_3N_3$—$(O$—$C_6H_4$—$CF_3)_5$, $R_3$ is —$CF_2CH_2OCH_2CH(OH)CH_2OH$, and n and m are between 1 and 30.

* * * * *